United States Patent [19]

Sharkey

[11] 4,282,346

[45] Aug. 4, 1981

[54] PREPARATION OF COPOLYAMIDE FROM DICARBOXYLIC ACID MIXTURE, PIPERAZINE AND POLYOXYALKYLENE DIAMINE

[75] Inventor: Hubert J. Sharkey, Cincinnati, Ohio

[73] Assignee: Emery Industries, Inc., Cincinnati, Ohio

[21] Appl. No.: 88,683

[22] Filed: Oct. 26, 1979

Related U.S. Application Data

[62] Division of Ser. No. 11,456, Feb. 2, 1979.

[51] Int. Cl.$^3$ .............................................. C08G 69/28
[52] U.S. Cl. .................................... 528/338; 528/341
[58] Field of Search ................................ 528/338, 341

[56] References Cited

U.S. PATENT DOCUMENTS

| | | | |
|---|---|---|---|
| 3,377,303 | 4/1968 | Peerman et al. | 528/341 |
| 3,738,950 | 6/1973 | Sturwold et al. | 528/341 |
| 3,882,090 | 5/1975 | Fagerburg et al. | 528/338 |
| 4,153,784 | 5/1979 | Horn et al. | 528/338 |

*Primary Examiner*—Harold D. Anderson
*Attorney, Agent, or Firm*—Kenneth D. Tremain

[57] ABSTRACT

Copolyamides derived from a mixture of short-chain and long-chain saturated aliphatic dicarboxylic acids, piperazine and a polyoxyalkylene diamine are excellent hot melt adhesives useful with a variety of substrates. These thermoplastic copolyamide resins are particularly useful adhesives for vinyl materials and are resistant to creep.

2 Claims, No Drawings

PREPARATION OF COPOLYAMIDE FROM DICARBOXYLIC ACID MIXTURE, PIPERAZINE AND POLYOXYALKYLENE DIAMINE

This is a division of application Ser. No. 011,456, filed Feb. 2, 1979.

BACKGROUND OF THE INVENTION

Polyamides derived from polymeric fatty acids, such as dimer acid, are well known and are highly useful adhesives for numerous applications with a wide variety of substrates. For example, polyamides derived from polymeric fatty acids and piperazine or dipiperidyl type diamines, and which optionally contain other dibasic acids or diamines, are described in U.S. Pat. No. 3,377,303. These polyamide resins are useful for hot melt bonding vinyl substrates. U.S. Pat. No. 3,738,950 discloses adipic acid modified polyamide resins derived from polymeric fatty acids and piperazine.

Where maximum vinyl adhesion is desired it is generally considered advantageous to incorporate as high a level of piperazine as possible in the polyamide without detracting from the other desirable characteristics of the resin. The weight percentage of piperazine present in polymeric fatty acid derived polyamides, however, is significantly less than it could be if it were possible to employ short-chain dibasic acids in place of all or a large portion of the polymeric fatty acid. It would be highly desirable therefore to prepare piperazine-containing thermoplastic polyamide resins which are not derived from polymeric fatty acids but which exhibit good overall characteristics making them suitable for hot melt bonding of various substrates. It would be even more advantageous if such resins contained larger than usual amounts of piperazine so that improved vinyl adhesion was obtained.

Ether diamines are also known to be useful reactants for the preparation of polyamides. U.S. Pat. No. 3,882,090 discloses water-soluble polyamides derived from an aliphatic diamine containing ether linkages and low molecular weight dicarboxylic acids which are useful as textile sizing agents, coatings and adhesives. British Pat. No. 1,319,807, for example, discloses copolyamide resins derived from polymeric fatty acids and low molecular weight aliphatic ether diamines. Similarly, U.S. Pat. No. 3,499,853 discloses thermoplastic adhesives derived from relatively low molecular weight ether diamines, by themselves or in combination with ethylene diamine, and polymeric fatty acids. More recently, the reaction of aliphatic ether diamines with short-chain aliphatic dicarboxylic acids has been shown. German Offenlegungsschrift 25 52 518 discloses thermoplastic adhesive compositions derived from a polyoxypropylene polyamine and an aliphatic or aromatic dicarboxylic acid having from 4 to 20 carbon atoms. German Offenlegungsschrift 25 52 455 further describes thermoplastic polyamide compositions which additionally contain piperazine with the polyoxypropylene polyamine and aliphatic or aromatic dicarboxylic acid and indicates these resins are useful adhesives particularly with epoxy materials.

SUMMARY OF THE INVENTION

I have now quite unexpectedly discovered that by reacting a particular mixture of aliphatic dicarboxylic acids with piperazine and polyoxyalkylene diamine it is possible to obtain markedly improved thermoplastic copolyamide adhesives useful for bonding a variety of substrates. To obtain these copolyamides very specific reactants must be employed within well defined limits. The resinous products of this invention exhibit superior adhesion to plasticized vinyl substrates. Quite unexpectedly the copolyamide adhesives have marked resistance to creep.

The copolyamide resins of this invention are obtained by the reaction of essentially stoichiometric amounts of a mixed acid component consisting of a mixture of a long-chain saturated aliphatic dicarboxylic acid having from 8 to 14 carbon atoms and a shorter-chain saturated aliphatic dicarboxylic acid having from 2 to 7 carbon atoms with piperazine and polyoxyalkylene diamine having an average molecular weight between about 200 and 800. Especially useful adhesive resins are obtained with short-chain dicarboxylic acids having from 4 to 6 carbon atoms and long-chain dicarboxylic acids having from 9 to 12 carbon atoms. The equivalents ratio of long- to short-chain dicarboxylic acids ranges from about 0.5:0.5 to 0.9:0.1. Polyoxypropylene diamines of average molecular weight 300 to 600 are preferred and the equivalents ratio of the piperazine to polyoxyalkylene diamine will range from about 0.7:0.3 to about 0.95:0.05. Up to 10% excess of acid or amine components can be employed for the preparation of these copolyamides and small amounts of other aliphatic, cycloaliphatic, or aromatic diamines or mixtures thereof included with the piperazine and polyoxyalkylene diamine. The copolyamide resins have acid values less than 10, amine values less than 20, softening points in the range 120°–170° C. and exhibit excellent resistance to creep.

DETAILED DESCRIPTION

The improved copolyamides of this invention are derived from a mixture of long-chain and short-chain saturated aliphatic dicarboxylic acids, piperazine and a polyoxyalkylene diamine. Optionally, a small amount of other diamine may be present.

Necessarily present with the piperazine to form the amine component is a polyoxyalkylene diamine corresponding to the general formula

where R is hydrogen or a methyl group and m is a positive integer such that the average molecular weight of the polyoxyalkylene diamine is between about 200 and 800. Especially useful polyoxyalkylene diamines for this invention are polyoxypropylene diamines having average molecular weights from 300 to 600.

The acid component is a mixture of saturated aliphatic dicarboxylic acids consisting of a short-chain dicarboxylic acid having from 2 to 7 carbon atoms and a longer-chain dicarboxylic acid having from 8 to 14 carbon atoms. This acid mixture is essential to obtain the improved creep-resistant copolyamide compositions of this invention. Especially useful short-chain dicarboxylic acids will have 4 to 6 carbon atoms and include succinic, glutaric and adipic acids. The longer-chain saturated acids will preferably have 9 to 12 carbon atoms with azelaic acid and sebacic acid being especially useful. By reacting the acid mixture, wherein the short-chain and long-chain dicarboxylic acids are present in specified ratios, with the piperazine and polyoxyalkylene diamine it is possible to obtain superior copolyamide adhesive resins which exhibit little or no plastic creep.

Essentially stoichometric amounts of the mixed acid component and the amine component consisting of piperazine and the polyoxyalkylene diamine are reacted to obtain these thermoplastic copolyamide resins. Not more than a 10% excess of either the acid or amine component should be present for the reaction and typically if an excess is to be employed it is preferable that the amine component be present in excess.

Generally the combination of adipic acid and piperazine in a homopolymer or copolymer system at low to moderate temperatures of about 20° C. to 160° C. will result in the formation of high-melting adipic-piperazine polymeric salt which is quite difficult to satisfactorily transform into the polyamide or copolyamide by elimination of water. If these conditions are used, low molecular weight polyamide segments and incompletely transformed polymeric organic salt (that is present as an insoluble or incompatible suspension) will be obtained so as to detract from the appearance and the utility of the final product. To avoid this problem and still utilize adipic acid with piperazine I have found that techniques which limit the formation of the polymeric adipic-piperazine salt could be developed by restricting the concentration of piperazine or adipic acid during amidation. This is accomplished by introducing anhydrous or aqueous piperazine slowly to the hot (160°–220° C.) mixture containing adipic acid so as to avoid the immediate formation of the polymeric salt while rapidly decomposing the carboxyl-rich salt system to form amide. By use of this technique no polymeric salt that resists amide formation will occur and little if any loss of adipic acid is seen. The reverse of this method, slow addition of molten or aqueous solutions of adipic acid to a hot (160°–220° C.) amino-terminated prepolymer of azelaic or other dibasic acids and piperazine with or without other diamines has been found to yield similar results but is less desirable because of the tendency of anhydrous molten adipic acid to degrade and the larger volumes of water needed to prepare aqueous adipic acid solutions.

The acid and amine components are then reacted at maximum temperatures up to about 240° C. until the desired acid and amine values are achieved. It usually requires several hours to complete the reaction which is conveniently followed by measuring the amount of water evolved. The reaction is preferably conducted under an inert atmosphere, such as nitrogen, and during the final stages of the reaction a vacuum may be applied to facilitate removal of the final traces of water and other volatiles present in the system.

The ratio of the long-chain dicarboxylic acid to short-chain dicarboxylic acid will range from about 0.5:0.5 to 0.9:0.1 based on equivalents. The equivalents ratio of piperazine to polyoxyalkylene diamine will range from about 0.7:0.3 to about 0.95:0.05. Superior resins which are especially useful for adhesion of vinyl substrates and which exhibit little or no plastic creep are obtained when the equivalents ratio of long- to short-chain acid is between about 0.65:0.35 and 0.80:0.20 and the equivalents ratio of the piperazine to polyoxyalkylene diamine is between 0.75:0.25 and 0.90:0.10.

Aliphatic, cycloaliphatic or aromatic diamines containing up to about 20 carbon atoms and more preferably from 2 to 10 carbon atoms such as ethylenediamine, hexamethylenediamine, xylenediamine, bis(aminoethyl)benzene, methylene- or isopropylidene-biscyclohexylamine, 1,4-piperazine-bispropylamine and the like can be employed at low levels. Also useful are dipiperidyl type diamines such as 1,3-di(4-piperidyl)-propane, 1,4-di(4-piperidyl)butane and 1,2-di(4-piperidyl)ethane and N-substituted piperazine or dipiperidyl type diamines wherein the substituent consists of an aminoalkyl or hydroxyalkyl radical containing from 1 to 4 carbon atoms such as N-aminoethylpiperazine, N-aminopropylpiperazine and the like. While these diamines may constitute up to 20%, based on equivalents, of the total amine component they are typically present in amounts not greater than 10%.

The resins of this invention, formed from the above-described reactants in the defined ratios, typically have an acid value (A.O.C.S. Method Te 1a-64) less than 10 and amine value (ASTM Method D2074-66) value less than 20. Preferably the acid value of the resin will be less than 7 and amine value less than 13. While the softening point (ASTM Method E-28) can range from about 100° C. to 200° C. it is preferable for most applications that the softening point fall between about 120° and 170° C. In an especially preferred embodiment of this invention, where the mixed acid component consisting of a mixture of azelaic acid and adipic acid (equivalents ratio of 0.65–0.75:0 0.35–0.25) is reacted with 0.80 to 0.95 equivalent piperazine and 0.15 to 0.25 equivalent polyoxypropylene diamine having an average molecular weight of about 350–450, a copolyamide having excellent vinyl adhesion and resistant to plastic creep and having the following general specification is obtained:

| | |
|---|---|
| Softening Point (°C.) | 135–155 |
| 190° C. Viscosity (poise) | 125–300 |
| Tensile Strength (psi) | 1400–1650 |
| Elongation (%) | 300–550 |

I have already indicated that one of the highly desirable features of the present copolyamides which is quite unexpected is their resistance to plastic creep. While other polyamide resins derived from piperazine and polyoxyalkylene diamines exhibit good adhesive properties it is only with the use of the mixed aliphatic dicarboxylic acid component with the piperazine and polyoxyalkylene diamine in the prescribed ratios that resins which exhibit little or no plastic creep can be obtained. This feature is highly desirable for many hot melt adhesive applications, particularly with difficultly bondable plasticized vinyl resin compositions, since it assures a permanent and fixed arrangement of the bonded assembly. In other words the bonded materials retain the same relative position so long as the assembly is not exposed to temperatures near or above the melt point or softening point of the resin.

The copolyamide resins of this invention are useful as hot melt adhesives with a wide variety of substrates. They can be used as such with both rigid or flexible, natural or synthetic, materials and are particularly useful for bonding vinyl materials. They may be employed to adhere leather, suede, and both woven and non-woven fabrics obtained from cotton, wool, silk, sisal, hemp, jute, rayon and synthetic fibers such as nylons, acrylics, polyesters, polyolefins and the like. They are also useful with natural rubber, polyurethanes, neoprene, styrene-butadiene copolymers, polybutadiene, ABS and other polymeric materials. The present resin compositions are similarly useful for hot melt bonding rigid materials such as metals, including aluminum, steel, etc., wood, paper products, phenolics, cork, pressboard, glass and the like. The copolyamide resins are applied using conventional hot melt application procedures such as spraying, printing, dipping, spreading, rolling, and the like and the film thickness can range from less than one mil up to fifty mils. While for most constructions the resin is applied to only one side of the substrate it may be applied to both sides in order to form a sandwich-type construction. The copolyamides of this invention may also be blended with other polyamide and polyester adhesive resins to obtain a wide variety of additional compositions useful for hot melt bonding. The present copolyamides may constitute as little as 0.5 weight percent of the total resins or, if other resins or additives are added thereto, can constitute as much as 99.9 weight percent of the total composition.

The invention is more fully illustrated by the following examples. All parts and percentages in these examples are on a weight basis unless otherwise indicated.

EXAMPLE I

Azelaic acid, adipic acid, piperazine and a polyoxypropylene diamine having an average molecular weight of about 400 were reacted to obtain a copolyamide adhesive resin. The reactant charge was as follows:

| | Parts |
|---|---|
| Azelaic Acid | 105 |
| Adipic Acid | 27 |
| Piperazine | 57 |
| Polyoxypropylene Diamine | 59 |

The ratio of equivalents (azelaic acid:adipic acid:piperazine:polyoxyalkylene diamine) for the above charge was 0.7:0.25:0.88:0.20. Azelaic and adipic acid and polyoxypropylene diamine were first charged to the reactor and heated under a nitrogen atmosphere to about 200°–210° C. Piperazine dissolved in hot water (60% aqueous solution) was then added slowly but at a steady rate with agitation so that foam-over was avoided and the temperature did not drop below 200° C. When the addition was complete the reaction was continued and the temperature increased to about 220° C. After the bulk of the theoretical amount of water was collected a vacuum of about 5 Torr was applied to remove the final traces of water. The resulting copolyamide resin (acid value <3 and amine value <20) had the following properties: 190° C. viscosity (Brookfield Thermosel) 200 poise, softening point of 145° C., Gardner color 3; tensile strength 1500 psi; and elongation at break 450%.

The above-prepared thermoplastic copolyamide resin was used to bond a variety of substrates. Various materials were bonded and the shear strength of the resulting bond determined in accordance with ASTM Test Procedure D 1002-72. The results obtained were as follows:

| Material | Shear Strength (psi) |
|---|---|
| Aluminum | 1280 |
| Steel | 1570 |
| Wood | 500* |
| Phenolic Resin | 550* |

| Material | Shear Strength (psi) |
|---|---|
| ABS Resin | 90 |

*Designates failure of substrate.

The adhesive resins were also evaluated in accordance with ASTM Test Procedure D 1876-72 to determine the peel or stripping strength of various adhesive bonds. Cotton duck, fabric-backed vinyl and an unsupported vinyl/ABS blend were employed for this test. The peel strengths observed for these respective materials were 18 lbs./in., 15 lbs./in. and 20 lbs./in. In all instances substrate failure occurred before failure of the adhesive bond.

Additionally, resistance to plastic creep of the adhesive resin was determined by bonding three inches of a 1"×5" strip of the unsupported vinyl/ABS material to a 6"×6" piece of pressboard. The bonded assembly was then placed in a 70° C. oven in an inverted horizontal position with a 100 gram weight attached to the 2" unbonded "tail". The extent of delamination over a four hour period was observed. If 2½" or more is pulled away from the pressboard in four hours or less this is considered to be a failure. Anything less than 2½" after four hours is acceptable. The less delamination the better the creep resistance of the adhesive resin. When the copolyamide of this example was evaluated for plastic creep no delamination was obtained after the four hour test period.

In another procedure to evaluate resistance to creep 1" steel strips are bonded with a ½" lap joint. The assembly is hung in an oven with a one pound weight suspended from the bottom. The temperature is increased at a rate of about 5° C./30 minutes until the bond fails. The copolyamide of this example withstood a temperature of 130° C. before failure.

EXAMPLE II

To demonstrate the unexpected improvement in creep resistance obtained when mixed saturated aliphatic dicarboxylic acids are employed with piperazine and the polyoxypropylene diamine (M.W. 400) the following reactions were conducted. For this example two copolyamides were prepared. In the first experiment (A) a mixture of adipic acid and azelaic acid was used whereas for the second reaction (B) azelaic was the sole dicarboxylic acid. The equivalents ratio of reactants and the properties of the resulting adhesive resins were as follows:

| | A | B |
|---|---|---|
| Azelaic Acid | 0.8 | 1.0 |
| Adipic Acid | 0.2 | — |
| Piperazine | 0.85 | 0.85 |
| Polyoxypropylene Diamine | 0.15 | 0.15 |
| Acid Value | 9.5 | 6.2 |
| Amine Value | 11.3 | 10.0 |
| Softening Point (°C.) | 126–139 | 130–133 |

Both copolyamides exhibited good adhesion to vinyl and other substrates including leather, metal and wood. However, copolyamide A, the product of this invention, also exhibited superior creep resistance. This product did not fail the plastic creep test even after 72 hours at 70° C. On the other hand, Product B failed the plastic creep test within 15 minutes at 70° C. The above data clearly demonstrates the superiority of the products of this invention.

EXAMPLES III–V

To demonstrate the ability to vary the ratio of reactants the following experiments were conducted. The table sets forth the equivalents ratio of the reactants and the properties of the resulting copolyamide resin:

|  | Ex. III | Ex. IV | Ex. V |
|---|---|---|---|
| Azelaic Acid | 0.5 | 0.75 | 0.7 |
| Adipic Acid | 0.5 | 0.25 | 0.3 |
| Piperazine | 0.8 | 0.8 | 0.85 |
| Polyoxypropylene Diamine (M. W. 400) | 0.2 | 0.2 | 0.15 |
| Acid Value | 4 | 3.2 | 4 |
| Amine Value | 15 | 9.1 | 11 |
| Softening Point (°C.) | 212 | 147–162 | 170–175 |
| Vinyl Adhesion | Excellent | Excellent | Excellent |
| Plastic Creep (in.) | 0 | 0 | 0 |

While all the resins passed the plastic creep test, the resins of Example IV did not fail even after 72 hours at 70° C.

Similar results are obtained when pimelic acid is substituted for adipic acid, when sebacic acid or dodecanedioic acid is substituted for azelaic acid and when a polyoxypropylene diamine having an average molecular weight of about 230 is substituted for the 400 molecular weight material.

I claim:

1. In a process for the preparation of thermoplastic copolyamide adhesive resins by the reaction of essentially stoichiometric amounts of reactants consisting essentially of (a) a mixture of adipic acid and a long-chain aliphatic saturated dicarboxylic acid having 8 to 14 carbon atoms, (b) piperazine and (c) a polyoxyalkylene diamine of the general formula

where R is hydrogen or a methyl group and m is a positive integer such that the average molecular weight of the polyoxyalkylene diamine is between about 200 and 800, the improvement which comprises heating the adipic acid, long-chain aliphatic saturated dicarboxylic acid and polyoxyalkylene diamine at 160° C. to 220° C. with agitation under an inert atmosphere and adding piperazine as an anhydrous melt or aqueous solution at a rate to avoid polymeric salt formation.

2. The process of claim 1 wherein the long-chain aliphatic saturated dicarboxylic acid is azelaic acid or sebacic acid, the polyoxyalkylene diamine is a polyoxypropylene diamine having an average molecular weight from 300 to 600, the equivalents ratio of adipic acid to azelaic or sebacic acid ranges from 0.5:0.5 to 0.9:0.1 and the equivalents ratio of piperazine to polyoxypropylene diamine ranges from 0.7:0.3 to 0.95:0.5.

* * * * *